J. L. MOORE.
TUBULAR STRUCTURE.
APPLICATION FILED FEB. 6, 1911.
1,061,487.
Patented May 13, 1913.
2 SHEETS—SHEET 1.
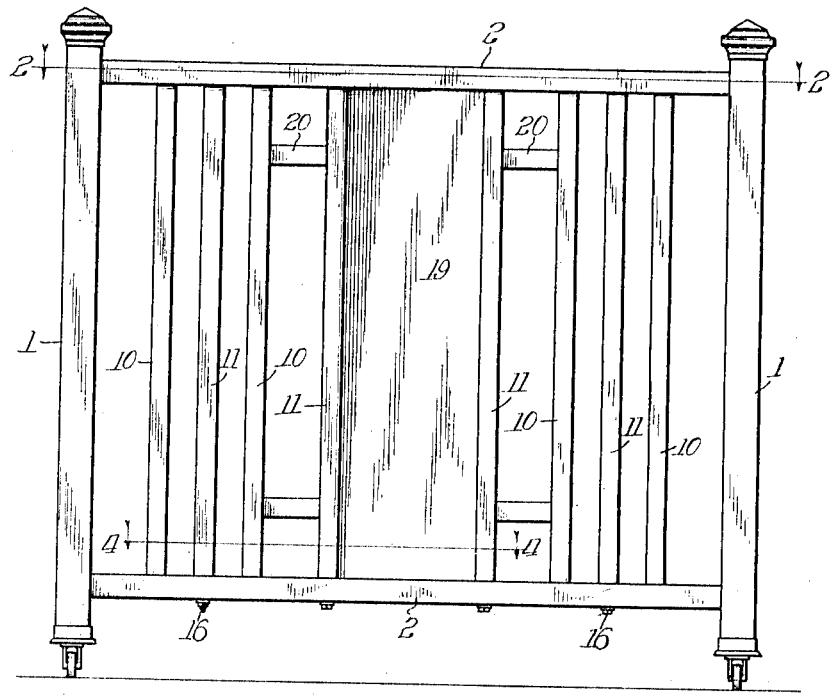
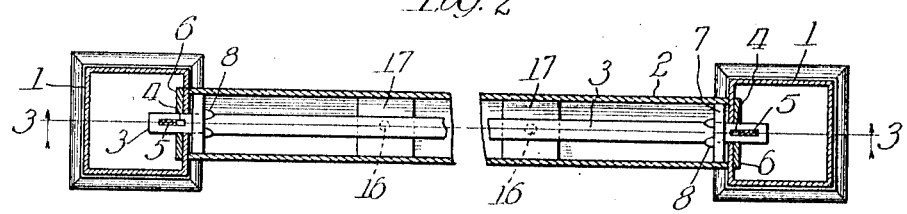
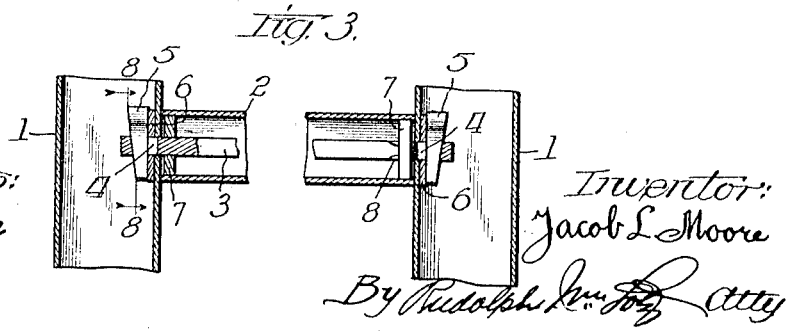

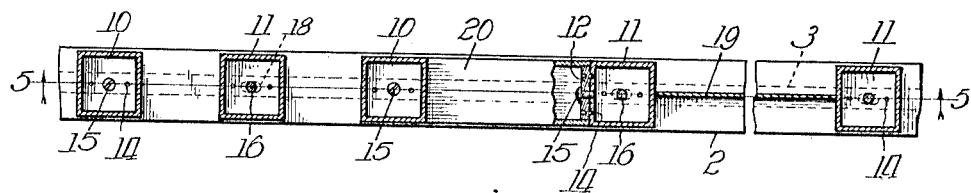

UNITED STATES PATENT OFFICE.

JACOB L. MOORE, OF BUTLER, PENNSYLVANIA, ASSIGNOR TO PITTSBURGH-HICKSON COMPANY, OF EAST BUTLER, PENNSYLVANIA, A CORPORATION OF PENNSYLVANIA.

TUBULAR STRUCTURE.

1,061,487. Specification of Letters Patent. Patented May 13, 1913.

Application filed February 6, 1911. Serial No. 606,901.

*To all whom it may concern:*

Be it known that I, JACOB L. MOORE, citizen of the United States, residing at Butler, in the county of Butler and State of Pennsylvania, have invented certain new and useful Improvements in Tubular Structures; and I do hereby declare the following to be a full, clear, and exact description of the invention, such as will enable others skilled in the art to which it appertains to make and use the same.

This invention relates to novel means for connecting tubes with each other for producing structures such as bedsteads and the like, the object being to provide a simple, efficient and cheap means for assembling the tubes in relative position to produce a structure of the desired shape which will permit the same to be rendered strong and durable and enable it to be knocked down when desired for purposes of repair, shipment and the like.

The invention consists in the novel organization of elements whereby the desired result is produced.

In the accompanying drawings illustrating my invention: Figure —1— is a view in elevation of a bedstead end constructed of tubing joined together in accordance with my invention. Fig. —2— is a fragmentary detail section of the same on an enlarged scale on the line 2—2 of Fig. —1—. Fig. —3— is a fragmentary detail vertical section on the line 3—3 of Fig. —2—. Fig. —4— is a fragmentary detail sectional view on the line 4—4 of Fig. —1—. Fig. —5— is a fragmentary detail vertical section on the line 5—5 of Fig. —4—. Fig. —6— is a fragmentary detail section on an enlarged scale showing the means employed for securing plates to a tube by means of which a transversely extending tube is held in place thereon. Fig. —7— is a fragmentary detail view in elevation showing the perforations in a tube for receiving the means for securing the aforesaid plate thereto. Fig. —8— is a fragmentary detail sectional view on the line 8—8 of Fig. —3—. Fig. —9— is a detail perspective view of a wedge adapted to be employed. Fig. —10— is a view similar to Fig. —8— showing the wedge illustrated in Fig. —9— in use. Fig. —11— is a fragmentary detail perspective view of one end portion of a lock bar showing the manner of providing lugs on the same to limit the movement of a washer relatively thereto in one direction.

In the manufacture of metallic bedsteads and other similar skeleton structures from tubing it is desirable to provide means which are very cheap for joining tubes extending transversely to each other securely together without resorting to expensive operations, such as, threading, soldering, brazing, welding or other similar means involving great outlay for labor. Owing to the lightness of the tubing usually employed in the manufacture of such structures it is also desirable to relieve the same of strain as far as possible and throw the latter upon stronger connecting parts employed. It is obviously also desirable that the joints between abutting tubes should be so made as to be entirely invisible and that the tubes should not only be held against separation at the joints but should also be held against relative rotation or lateral displacement.

My invention has for its object to provide means for accomplishing the foregoing results in a very cheap and efficient manner.

It is well-known that the posts of a bedstead are subjected to the loads carried thereby, the latter being transmitted thereto by means of the side rails upon which the springs and mattress, etc., are supported. The ornamental part of the bedstead interposed between the posts at either end thereof serve primarily to hold the posts in proper relative position and, secondly, to impart to the bedstead a highly ornamental appearance. To maintain the posts of either bedstead end rigidly parallel with each other requires the use of horizontal connecting members of sufficient strength to successfully resist lateral strains or stresses tending to distort the bedstead end, and for this reason the same must be firmly secured to said posts. The other tubing interposed between the horizontal cross-bars and the vertical bed posts is not subjected to any great strains or stresses and is mainly intended for purposes of ornamentation.

In the bedstead end, shown in Fig. —1—, for example, the bed posts 1 are made of square tubing, the same being joined together by means of the horizontal cross-bars 2 also made of square tubing of smaller diameter than the tubes 1 against which said tubes 2 are adapted to abut at their ends. In order to hold said tubes 2 firmly in engagement with the tubes 1, I provide means consisting of rods 3 preferably rectangular in cross-section which are of greater length than the tubes 2 and pass centrally through the same and through openings preferably just sufficient for the passage of said rod 3 in the opposing walls of the tubes 1. In the end portions of said rod 3 are longitudinal slots 4 adapted to receive wedges 5. Washers 6 are inserted upon the slotted end portions of said rods 3 and bear upon the inner faces of the walls of the tubes through which the end portions of said rods 3 pass, the wedges serving, when driven into place in said slots, to force said washers against the opposing walls of the tubes 1 and thus force the latter very firmly into contact with the adjacent ends of the tubes 2, the latter being thus subjected exclusively to compression strain or stress throughout their lengths which they are well adapted to bear. The openings in the walls of the tubes 1 through which the said end portions of the rods 3 pass are rectangular and of a size to snugly engage the same thereby holding said rods against rotation relatively to the tubes 1. It is also essential that the rods 3 be maintained in the center of the tubes 2 and be held against rotation relatively thereto and to this end I employ rectangular washers 7 adapted to snugly fit within the tubes 2 and which are provided with central rectangular openings of a size just sufficient to permit the rod 3 to pass therethrough, said washers being disposed in the end portions of said tubes 2 and being held against movement inwardly thereof and relatively to the rods 3 by means of small lugs or projections 8 on the latter preferably formed by distorting the same, as shown in Fig. —11—, this being effected by means of a die adapted to compress the corner portions of the rods 3 so as to provide recesses in the upper and lower faces thereof or either of them, the metal displaced thereby being forced laterally outwardly to form the said projections 8. This means of providing projections is well known in the art.

The wedges employed are preferably formed of strips of sheet metal having one straight edge each and the other edge of which tapers from the middle portion thereof to the ends, the latter being of less width than said middle portion. The said strips are then folded over at the middle portion thereof so that the tapered end portions oppose each other. The wedge thus formed after being driven through the slots 4 in the said rods 3 are expanded in the manner of cotter pins and are thus prevented from springing out of the said slot 4 as will be obvious and as clearly shown in Fig. —8—. In order to avoid the necessity of expanding the wedges after the same have been driven into place said wedges may also be formed as shown in Fig. —9— either one or both legs thereof having a lateral off-set portion 9 between its ends to form an inclined shoulder at said point which after the wedge has been driven into place is adapted to engage the lower faces of the rods 3 by the natural expansion of the wedge due to its inherent spring thus also preventing said wedges from accidentally springing out of said slots, as will be obvious.

It will be apparent that, by reason of this manner of constructing the bedstead, the strains or stresses due to lateral pressures on the bedstead end will fall upon the joints between said tubes 1 and 2 and by reason of the strength imparted thereto by the washers 6 and 7 and the rods 3 and wedges 5 said strains or stresses will be readily taken up by these parts and the relatively thin walled tubing thus relieved thereof.

The vertical tubes 10 and 11 interposed between the tubes 2 are held in place by means of small plates 12 corresponding in shape and size with the bore of each tube and which are secured upon the outer faces of the opposing walls of the respective tubes 2 by means of small lugs or projections 13 on one face of each of said washers which are adapted to enter small openings 14 in the walls of the tubes 2 to which said plates are secured. The said lugs or projections 13 may be formed in any suitable manner, this being preferably effected, however, by partially punching said plates so as to throw a projection from one face thereof, the metal forming the latter being severed from the body of the plate but held in place in the latter by friction in a well-known manner. Accurately cylindrical lugs or projections 13 are thus formed which may be driven into slightly smaller openings 14 in the walls of the tube 2, said plates being thus firmly held thereon by friction. It is preferable, however, to hold said plates in place by means of screws 15 passing through a central opening in the plate 12 and into a threaded opening in the wall of the tube 2 disposed midway between said openings 14. The said lugs 13 serve by engagement in the openings 14 not only to hold the plates in place but also to hold the same against movement in all directions relatively to the tubes 2. The said tubes 10 are held in place by inserting the ends thereof over said plates 12 as will be readily seen.

Lateral tubes 20 extending parallel with the tubes 2 may be interposed between adjacent tubes 10 and 11 in the same manner as clearly shown in Fig. —4—.

It is, of course, desirable to prevent the middle portions of the tubes 2 from being distorted to an extent sufficient to increase the distance between the same so as to withdraw one of said plates 12 from the lower end of a tube 10 as might occur, for example, if a child climbs upon the bedstead end resting its weight upon the lower tube 2. To prevent this it is essential that the tubes 2 be tied together so that such distortion will be rendered impossible. To accomplish this I provide long bolts 16 which pass through the horizontal walls of the lower tube 2 and through the tubes 11 and the lower horizontal wall of the upper tube 2, the upper end portions of said bolts 16 being engaged in the threaded openings in the washers or plates 17 disposed within said upper tube 2 and which are of a width to engage the inner faces of the vertical walls thereof to hold said plates or washers 17 against rotation relatively thereto. The said bolts 16 pass through openings or slots 18 in the lower rod 3 and through the central openings in the plates 12 by means of which said tubes 11 are held against rotation relatively to the tubes 2. The last-named plates 12 may be further secured in place by means of screws similar to the screw 15 but disposed eccentrically of said plates as will be obvious.

In assembling a bedstead end or other structure composed of tubing adapted to be joined in the manner above described it is primarily necessary to mount upon the tubes 2 the several plates 12 adapted to engage the interposed vertical tubes 10 and 11, the latter being in turn primarily equipped with plates 12 for engaging lateral tubes 20 interposed between the same. The said tubes 2, 10 and 11 and all lateral tubes 20 together with the panels, such as the panel 19, are then assembled and this assembled structure then mounted between the posts 1 so that after the wedges 5 have been driven in place and expanded and the caps at the tops and bottoms of the tubes or posts 1 secured in place the bedstead end is finished. The assembling of the latter is very quickly and easily effected.

The invention is applicable to tubing of all cross-sectional shapes such as cylindrical, hexagonal, oblong, etc., it being obvious, however, that where cylindrical tubing is fitted together the ends of tubes interposed between and extending transversely to other tubes must be shaped at their ends to fit the surfaces of the latter and the recesses thus provided in the ends of said interposed tubes will in and of themselves hold them against rotation relatively to the tubes against which they abut at their ends, the plates 12 and washers 4 and 7 required in the assembling of rectangular tubing being replaced by similar circular members which may be rotatable relatively to the tubes in which they are received as their sole purpose in such case would be to maintain the rods centered therein. The rods 3 and wedges, as well as the bolts 16, and plates 17, would be used in substantially the same manner as herein described.

It will be obvious further that the rods 3 may be of any suitable shape in cross section other than that shown so long as they continue to perform the requisite function, the latter being somewhat dependent upon the cross-sectional shape of the tubing employed.

I claim as my invention:

1. In a structure of the kind specified, the combination with parallel polygonal tubes and a transversely disposed polygonal tube abutting at its ends against an outer wall of each of the first-named tubes, of polygonal washers fitting within the transverse tube and having central polygonal openings, polygonal rods fitting said openings and of greater length than said tube projecting at its ends through polygonal openings in the walls of the first-named tubes against which said transverse tube abuts, and wedges disposed in openings in the end portions of said rod, substantially as described.

2. In a structure of the kind specified, the combination with parallel polygonal tubes and a transversely disposed polygonal tube abutting at its ends against an outer wall of each of the first-named tubes, of polygonal washers fitting within the transverse tube and having central polygonal openings, polygonal rods fitting said openings and of greater length than said tube projecting at its ends through polygonal openings in the walls of the first-named tubes against which said transverse tube abuts, projections on said rod adjacent its ends for limiting the movement of said washers thereon in one direction, and wedges disposed in openings in the end portions of said rod, substantially as described.

3. In a structure of the kind specified, a pair of parallel tubes, filler tubes interposed between the same, plates mounted upon the outer faces of said parallel tubes corresponding in shape and size with the bores of the filler tubes and adapted to enter the latter to hold the same against lateral movement, plates mounted within one of said parallel tubes non-rotatable therein and provided with threaded openings, the other of said parallel tubes and the plates mounted thereon having registering openings, and rods each having a threaded end passing through the openings in the last-named parallel tube and plates and through the filler tubes and the plates and openings in the other of said parallel tubes and engaging the plates within the latter.

In testimony whereof I have signed my name in presence of two subscribing witnesses.

JACOB L. MOORE.

Witnesses:
RUDOLPH WM. LOTZ,
W. D. DAY.

Copies of this patent may be obtained for five cents each, by addressing the "Commissioner of Patents. Washington, D. C."